United States Patent
Crosnier et al.

[19]

[11] Patent Number: 6,010,197
[45] Date of Patent: Jan. 4, 2000

[54] HUB FOR SPOKED WHEELS

[75] Inventors: Guillame Crosnier, Gournay-es-bray, France; Günter Nürnberger, Schweinfurt, Germany; Werner Steuer, Schweinfurt, Germany; Peter Kröger, Schweinfurt, Germany; Hans-Joachim Mayer, Euerbach, Germany

[73] Assignee: SRAM Deutschland GmbH, Schweinfurt, Germany

[21] Appl. No.: 09/095,267

[22] Filed: Jun. 10, 1998

[30] Foreign Application Priority Data

Jun. 10, 1997 [DE] Germany ................ 197 24 327

[51] Int. Cl.$^7$ ................................. B60B 1/02
[52] U.S. Cl. .............. 301/59; 301/110.5; 301/110.6; 301/56; 301/61
[58] Field of Search .............. 301/110.5, 110.6, 301/124, 55, 56, 59, 61

[56] References Cited

U.S. PATENT DOCUMENTS

| | | | |
|---|---|---|---|
| 457,861 | 8/1891 | Bretz | 301/110.5 |
| 502,006 | 7/1893 | Messmer | 301/110.5 |
| 553,616 | 1/1896 | Handloser | 301/61 |
| 555,648 | 3/1896 | Latta | 301/56 |
| 556,123 | 3/1896 | Wolff | 301/56 |
| 574,139 | 12/1896 | Ourry | 301/61 |
| 574,712 | 1/1897 | Copeland | 301/58 |
| 586,138 | 7/1897 | Morrow | 301/56 |
| 596,261 | 12/1897 | Croskey | 301/56 |
| 607,175 | 7/1898 | Keating | 301/56 |
| 612,323 | 10/1898 | Fraser | 301/61 |
| 614,334 | 11/1898 | McGlinchey | 301/56 |
| 622,602 | 4/1899 | Burwell | 301/61 |
| 684,285 | 10/1901 | Mazier | 301/59 |
| 734,588 | 7/1903 | Miller | 301/56 |
| 5,429,421 | 7/1995 | Watson | 301/110.5 |
| 5,489,147 | 2/1996 | Borsai | 301/59 |
| 5,626,401 | 5/1997 | Terry, Sr. et al. | 301/59 |
| 5,882,088 | 3/1999 | Yahata | 301/110.5 |

FOREIGN PATENT DOCUMENTS 88 14 753 U1  2/1989  Germany .

*Primary Examiner*—D. Glenn Dayoan
*Assistant Examiner*—Long Bao Nguyen
*Attorney, Agent, or Firm*—Cohen, Pontani, Lieberman & Pavane

[57] ABSTRACT

A hub for aligning a plurality of spokes on a spoked wheel. The hub has a cylindrical hub sleeve and a hub axis extending centrally through the hub sleeve. The hub includes a flange-type hub head disposed at one end of the hub sleeve and extending circumferentially about the hub axis. The hub head defines a plurality of guide slots, each of the plurality of spoke guide slots being dimensioned and configured to receive and orient each of the plurality of spokes along a radial plane of the hub head such that the plurality of spokes define a plurality of tangent lines around an imaginary circle centered at the hub axis and that the tangent lines form a polygon centered at the hub axis.

12 Claims, 3 Drawing Sheets

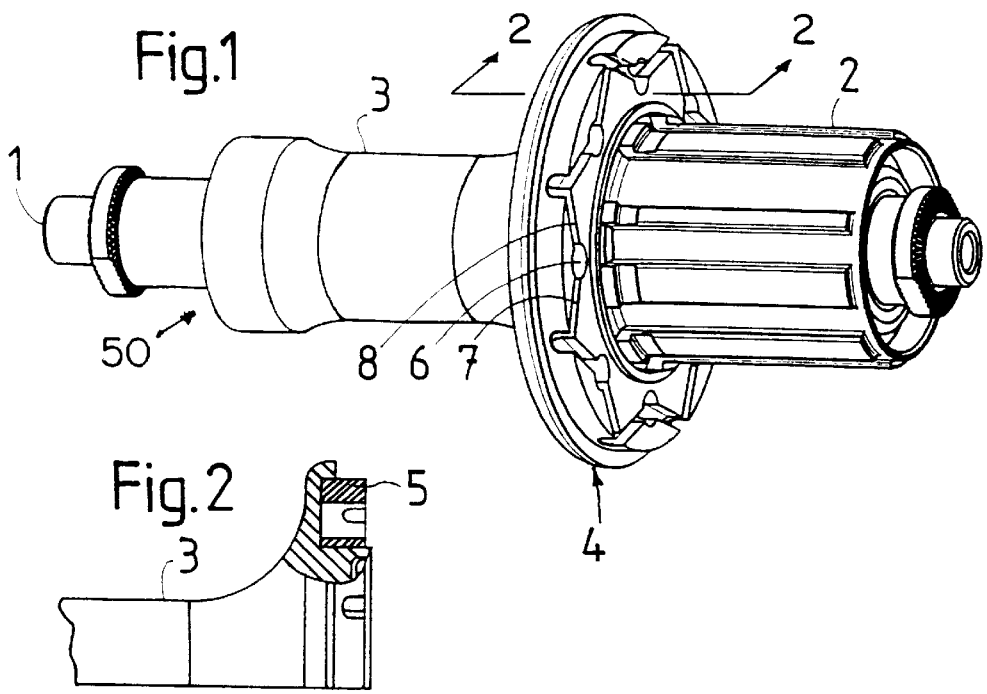
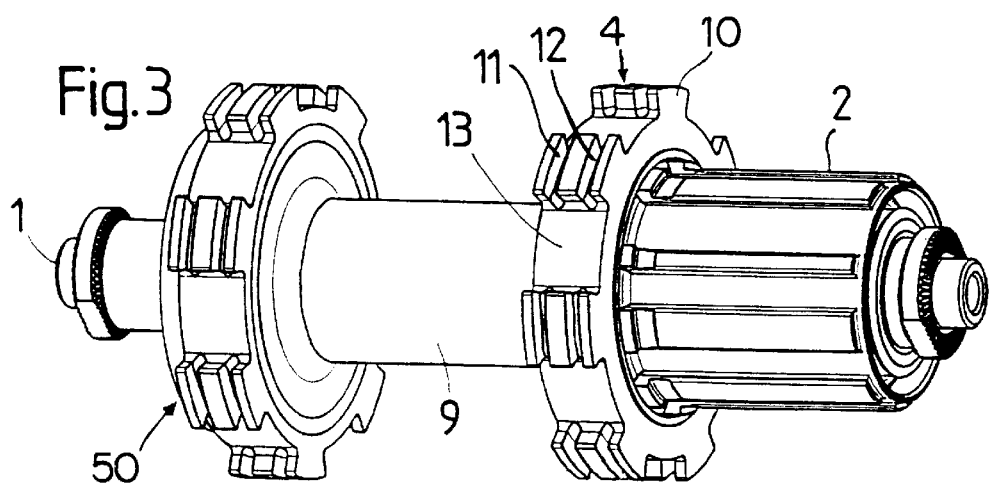
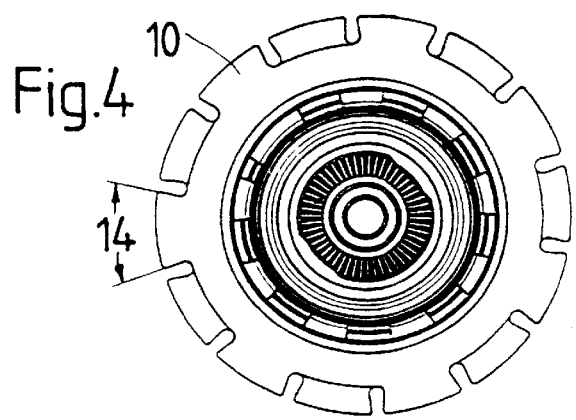

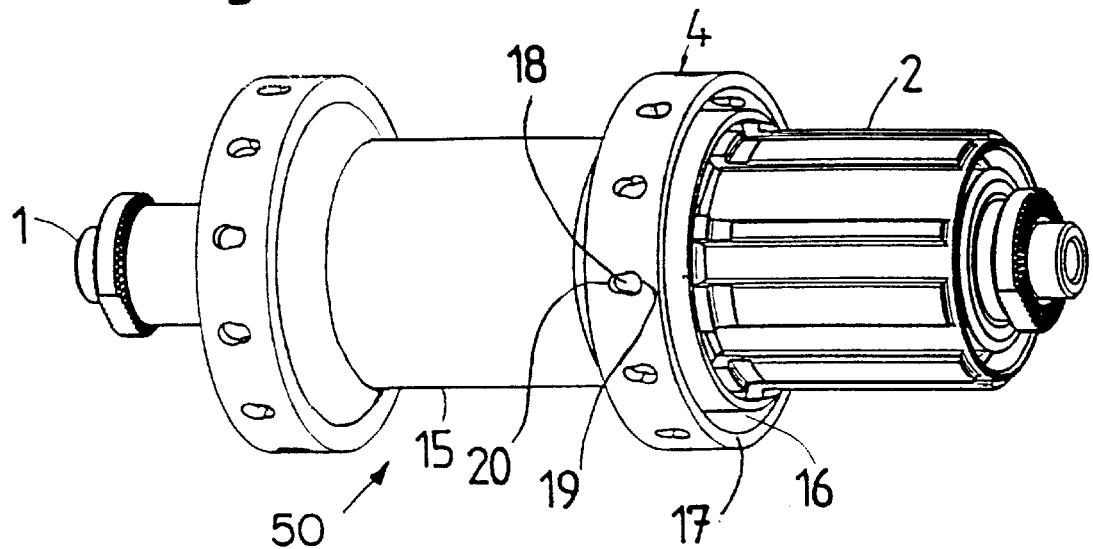
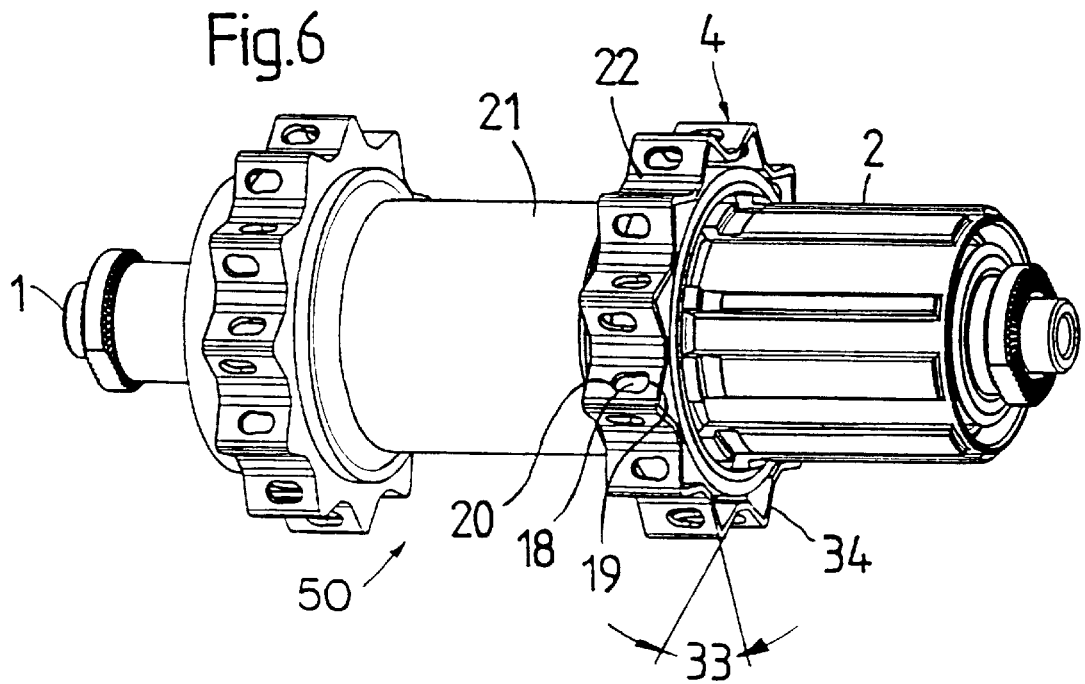

HUB FOR SPOKED WHEELS

BACKGROUND OF THE INVENTION

1. Field of the Invention

The present invention relates to hubs for spoked wheels and, more particularly, to a spoked wheel hub having a flange portion configured to retain and align spokes.

2. Description of the Related Art

DE 88 14 753 U1 discloses a hub for a spoked wheel with flange-type hub heads. On its exterior side, the hub head is equipped with a spoke holder having open radial guides disposed circumferentially around the hub and directed radially toward a rim to be attached to the hub. Each of the openings of the radial guides is shaped as a keyhole wherein a wider part of the keyhole forms an end area directed toward the hub axis of the exterior opening of each guide.

Spoke holders of this type provided at the hub heads are tailored for the production of a spoked wheel with radial spokes. The keyhole-type openings are suitable for attaching the spoke heads of the spokes; however, they are not designed for orienting the spokes or for temporarily clamping them so as to facilitate the spoking process, i.e. bringing the spoke ends opposite the spoke heads into the vicinity of the corresponding attachment nipple located at the rim.

SUMMARY OF THE INVENTION

An object of the present invention is to provide hubs with flange-type hub heads into which spoke heads can be inserted so as to temporarily secure the spoke heads to the hub heads while orienting the spoke ends to their corresponding attachment nipples located circumferentially on a rim.

In one embodiment of the present invention, a hub for aligning a plurality of spokes on a spoked wheel includes a cylindrical hub sleeve and a hub axis extending centrally through the hub sleeve. The hub includes a flange-type hub head disposed at one end of the hub sleeve and extending circumferentially about the hub axis. The hub head defines a plurality of guide slots, each of the plurality of spoke guide slots being dimensioned and configured to receive and orient each of the plurality of spokes along a radial plane of the hub head such that the plurality of spokes define a plurality of tangent lines around an imaginary circle centered at the hub axis and that the tangent lines form a polygon centered at the hub axis.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings:

FIG. 1 is a perspective view of a first embodiment of a spoked wheel hub constructed in accordance with the present invention;

FIG. 2 is a partial sectioned view of the spoked wheel hub of FIG. 1 along line 2—2;

FIG. 3 is a perspective view of a second embodiment of the spoked wheel hub of the present invention;

FIG. 4 is an axial view of the spoked wheel hub of FIG. 3;

FIG. 5 is a perspective view of a third embodiment of the spoked wheel hub of the present invention;

FIG. 6 is a perspective view of a fourth embodiment of the spoked wheel hub of the present invention;

DETAILED DESCRIPTION OF THE PRESENTLY PREFERRED EMBODIMENTS

Figure 7:
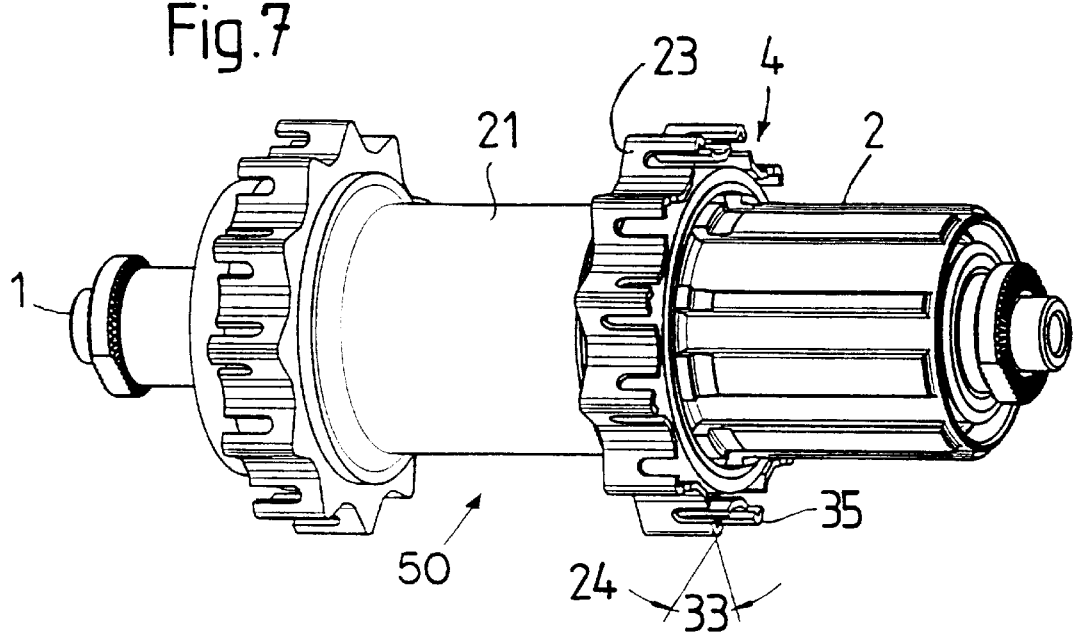
FIG. 7 is a perspective view of a fifth embodiment of the spoked wheel hub of the present invention.

Referring now to the drawings, FIG. 1 depicts a first embodiment of a spoked wheel hub 50 having a hub axis 1 and including a driver 2 and a hub sleeve 3 connected to the driver 2. The hub sleeve 3 includes a flange-type hub head 4 connected to the driver 2 and arranged proximate an axial end of the hub sleeve 3. Typically, two flange-type hub heads are attached to opposite ends of the hub sleeve 3; however, for simplicity sake, only one flange-type hub head 4 is shown.

The flange-type hub head 4 has spoke head receptacles 6 for anchoring or attaching spoke heads, and a first spoke guide slot 7 and a second spoke guide slot 8 connected to each spoke head receptacle 6 and dimensioned and configured for retaining and orienting spokes. Preferably, each of the spoke head receptacles 6 is dimensioned and configured to hold two spoke heads so that a first spoke is arranged in the first spoke guide slot 7 and a second spoke is arranged in the second spoke guide slot 8. By means of the first and second guide slots 7 and 8, the spokes attain their directional orientation toward their respective attachment points on a wheel rim and establish an appropriate intersection therebetween. Preferably, one of the first or the second guide slots 7, 8 runs deeper than the other, so that when the spokes are inserted therein, a first intersection of the spokes is defined.

As shown in FIG. 2, the flange-type hub head 4 preferably includes a carrier ring 5 for defining the spoke receptacles 6 and the guide slots 7, 8. In view of the high clamping forces of the spokes, the carrier ring 5 is preferably made of a stronger material than that of the hub sleeve 3. The carrier ring 5 is preferably dimensioned for press-fit engagement with the flange-type hub head 4. Alternatively, the carrier ring 5 may be integrally formed with the hub head 4.

FIG. 3 depicts a second embodiment of the spoked wheel hub 50 of the present invention. As shown, the hub 50 has a hub sleeve 9 and a flange-type hub head 4. The flange-type hub head 4 has flange segments 10 and recesses 13 defined between adjacent or successive flange segments 10. Each of the plurality of flange segments defines a spoke head retaining position proximate a bottom portion of the recess. Each of the flange segments 10 defines two circumferentially extending guide slots disposed along a top surface thereof: a first guide slot 11 and a second guide slot 12. The guide slots 11, 12 are spaced from each other and formed by grooving. The guide slots 11, 12 are dimensioned to be as wide as the thickness of the to-be-inserted spokes so that the spokes can be aligned tangentially relative to the hub axis. Preferably, the guide slots 11, 12 are dimensioned for frictional receipt of the spokes so that the spokes can be clamped therein. The guide slots 11, 12 are so oriented that the spokes inserted therein are arranged substantially tangentially to the hub axis 1 and that the spokes are inserted toward opposite sides of a flange segment 10. An advantage of this design is a contact-free arrangement of the spokes at their intersection points.

FIG. 4 is an end view of the hub head 4 of FIG. 3. As shown, the flanks of a flange segment 10 are inclined and form an angle 14 therebetween, thereby giving the flange segment 10 a dove-tail shape. When the spokes inserted in the manner described above are clamped within the guide slots 11, 12, the spoke heads are drawn radially inwardly toward the hub axis 1 when tensioned in a tangential direction and are arranged proximate a bottom portion of the recesses 13. The angle 14 is so selected that the spokes will not become detached from the inclined flanks of the flange segment 10 during use.

FIG. 5 depicts a hub with flange-type hub heads, each of which includes a cylindrical flange 17 having a ring groove 16 defined concentrically therewithin. Similar to the aforementioned prior art DE 88 14 753 U1, the cylindrical flange 17 has a keyhole-like profile hole 18 having a large arcuate region 19 and a small arcuate region 20, for mounting radially directed spokes. This hub head allows a spoke to be mounted after the spoke head is inserted through the large arcuate region 19 of the cylindrical flange 17 and then moved toward the small arcuate region 20. Such a hub sleeve 15 is easy to produce, requiring only that the keyhole-like profile holes 18 be bored.

To reduce the cost of producing the profile holes 18 through metal-removing machining operation, the present invention provides a hub sleeve 21 with a flange-type hub head 4 constructed from a rotationally symmetrical sheet-metal ring 22, as shown in FIG. 6. The sheet-metal ring 22 has a cup-like shape and a centrally punched base which is connected to the hub sleeve 21. For directional orientation of the spokes, the sheet-metal ring 22 may be star-shaped and has teeth 34. The flanks of the teeth 34 are stamped with profile holes 18 having a large arcuate region 19 and a small arcuate region 20. The flanks of the teeth 34 are inclined so as to form a flank angle 33 that ensures that a spoke secured by the small arcuate region 20 of the profile hole 18 is oriented at an angle, relative to an imaginary tangent at this attachment point, corresponding to half of the flank angle 33. Thus, by premounting the spokes in the profile holes 18 of the flange-type hub heads 4, spoking and clamping of a spoked wheel are made easier by the directional orientation of the spokes provided by the ring 22.

FIG. 7 shows a hub sleeve, each of whose flange-type hub heads 4 is also formed from a star-shaped sheet-metal ring 23 with the same structure as the star-shaped sheet-metal ring 22 depicted in FIG. 6, except that in this embodiment, the spokes are mounted in notches 24 disposed at an axial end of a hub. Each of the notches 24 extends axially toward an opposite hub end. The notches 24 are dimensioned to receive spoke heads such that the spoke head rests inside teeth 35. The notches 24 are of various depths, so that here, too, the defined intersection points of spokes are taken into account.

Figure 8:
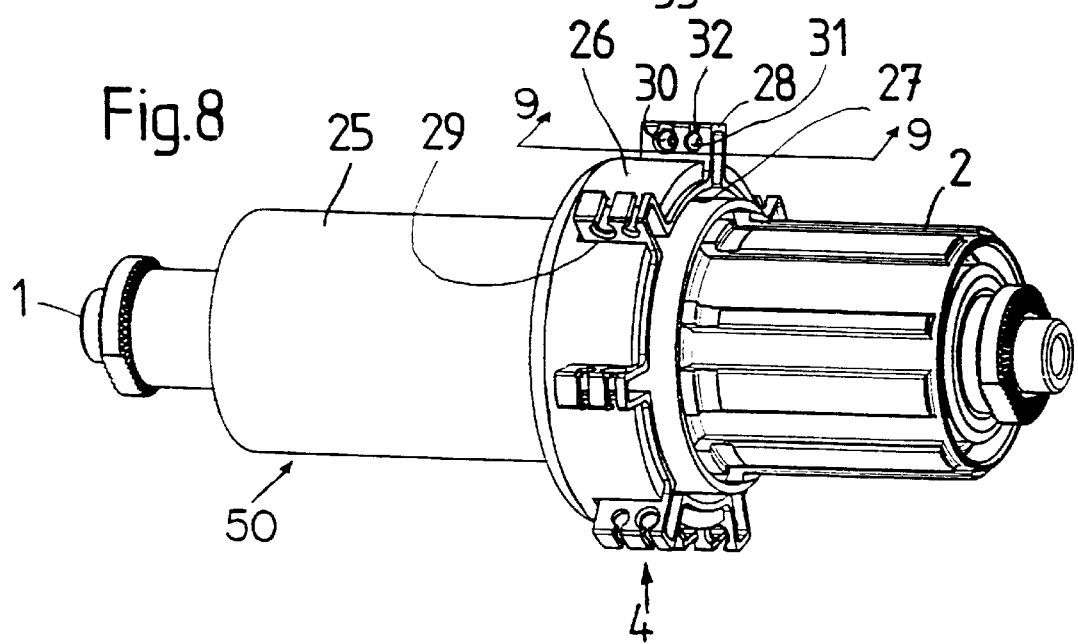
FIG. 8 is a perspective view of a sixth embodiment of the spoked wheel hub of the present invention.

FIG. 8 shows a hub with a hub sleeve 25 and a flange-type hub head 4. The flange-type hub head 4 includes a cylindrical flange 26 having notches 29 defined successively along the circumference of the flange 26, and a sheet-metal ring 27 having spoke holders or projections 28 extending radially outwardly. The flange 26 is arranged concentrically within the flange 26 such that the projections 28 protrude through the notches 29 of the flange 26.

Figure 9:
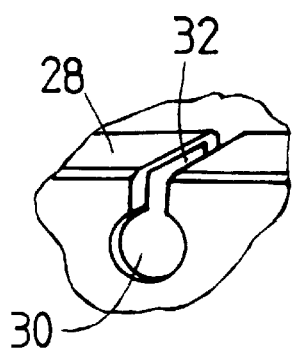
FIG. 9 is a partial sectioned view of the spoked wheel hub of FIG. 8 along line 9—9.

Each projection 28 has two pairs of bores—each pair consisting of a first bore 30 and a second bore 31—defined on each flank of the projection 28. The first and second bores 30, 31 have different diameters. Preferably, the first bore 30 has a diameter larger than that of the second bore 31. The two pairs of bores are arranged in an alternating fashion, that is, the first bore 30 of a first pair is disposed adjacent the second bore 31 of a second pair on each flank of the projection 28. This arrangement of the bores advantageously provides directional orientation of the spokes and defines positions of the spokes relative to each other, particularly, their intersection points. To facilitate assembly of the spokes, each projection 28 provides a circumferential slit 32 extending from a top edge of the projection 28 and between the first and second bores 30, 31 of each pair of bores, as shown in FIG. 9. In use, after inserting a spoke through the slit 32, the spoke head is placed within the first bore 30 until it abuts an interior surface of the flank defining the second bore 31, thereby detachably affixing the spoke in the projection 28 of the metal ring 27. A further advantage of this embodiment of the flange-type hub head is that the cylindrical flange 26 and the metal ring 27 with its projections 28 can be produced in a virtually burr-free manner.

The spoke attachment to the flange-type hub head 4 shown in FIG. 8 is but one example of detachably securing and orienting spokes around a hub. It is contemplated that an extremely wide variety of sheet-metal rings with stamped or drawn spoke receptacles in suitable recesses on the cylindrical flange may also be provided. It is also contemplated that ring sections or individual spoke receptacles in receptacles formed specifically for this purpose in the cylindrical flange.

For reasons of simplicity in spoking, as well as for other functional reasons, it is proposed that differently equipped flange-type hub heads be arranged on one and the same hub sleeve. For example, spokes can be inserted crosswise on one side and radially on one side.

Finally, two differently embodied flange-type hub heads can be arranged on one hub sleeve, namely, one for radial spoking and the other for crosswise spoke arrangement.

While there have been shown and described and pointed out fundamental novel features of the present invention as applied to a preferred embodiment thereof, it will be understood that various omissions and substitutions and changes in the methods described and in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A hub for aligning a plurality of spokes on a spoked wheel, the hub comprising a cylindrical hub sleeve and a hub axis extending centrally through the hub sleeve; and a flange-type hub head disposed at one end of the hub sleeve and extending circumferentially about the hub axis, the hub head having an annular wall extending circumferentially around the hub axis and facing radially outwardly, said annular wall being dimensioned and configured to retain and orient each of the plurality of spokes along a radial plane of the hub head such that the plurality of spokes define a plurality of tangent lines around an imaginary circle centered at the hub axis, the tangent lines forming a polygon centered at the hub axis, said annular wall further including a plurality of flange segments projecting radially outwardly therefrom, each of the plurality of flange segments forming a first guide slot and a second guide slot.

2. The hub of claim 1, wherein the first guide slot and the second guide slot extend circumferentially along a top surface of each flange segment, are spaced from each other, and are formed by grooving.

3. The hub of claim 1, wherein each of the first guide slot and the second guide slot is dimensioned to clamp a spoke therein.

4. The hub of claim 1, wherein said annular wall of the flange-type hub head further defines a recess between adjacent flange segments of the plurality of flange segments, each flange segment of the plurality of flange segments has two inclined flanks, the two inclined flanks forming an angle therebetween so as to provide a dove-tail shape to said flange segment and so as to arrange a spoke head proximate a bottom portion of the recess.

5. A hub for aligning a plurality of spokes on a spoked wheel, the hub comprising a cylindrical hub sleeve and a hub axis extending centrally through the hub sleeve; and a flange-type hub head disposed at one end of the hub sleeve and extending circumferentially about the hub axis, the hub head having an annular wall extending circumferentially around the hub axis and facing radially outwardly, said annular wall being dimensioned and configured to retain and orient each of the plurality of spokes along a radial plane of the hub head such that the plurality of spokes define a plurality of tangent lines around an imaginary circle centered at the hub axis, the tangent lines forming a polygon centered at the hub axis, said annular wall being configured as a cupped and centrally punched star-shaped sheet-metal ring having a plurality of radially projecting teeth, each of the plurality of teeth being defined by two inclined flanks which form a flank angle therebetween, each of the inclined flanks includes means for retaining a spoke head of a spoke and orienting the spoke at an angle relative to one of the plurality of tangent lines defined at this point, corresponding to half of the flank angle.

6. The hub of claim 5, wherein the means for retaining and orienting a spoke is a profile hole defined in each of the inclined flanks, the profile hole having a large arcuate region and a small arcuate region, the small arcuate region being dimensioned to hold the spoke perpendicularly relative to said each inclined flank.

7. A hub for aligning a plurality of spokes on a spoked wheel, the hub comprising a cylindrical hub sleeve and a hub axis extending centrally through the hub sleeve; and a flange-type hub head disposed at one end of the hub sleeve and extending circumferentially about the hub axis, the hub head having an annular wall extending circumferentially around the hub axis and facing radially outwardly, said annular wall being dimensioned and configured to retain and orient each of the plurality of spokes along a radial plane of the hub head such that the plurality of spokes define a plurality of tangent lines around an imaginary circle centered at the hub axis, the tangent lines forming a polygon centered at the hub axis, said annular wall of the flange-type hub head being configured as a star-shaped ring disposed at one end of the hub sleeve, the star-shaped ring having a plurality of teeth, each of the plurality of teeth being defined by two inclined flanks, each of the inclined flanks defining a notch dimensioned to receive a spoke head and oriented toward an opposite end of the hub head.

8. A hub for aligning a plurality of spokes on a spoked wheel, the hub comprising a cylindrical hub sleeve and a hub axis extending centrally through the hub sleeve; and a flange-type hub head disposed at one end of the hub sleeve and extending circumferentially about the hub axis, the hub head having an annular wall extending circumferentially around the hub axis and facing radially outwardly, said annular wall being dimensioned and configured to retain and orient each of the plurality of spokes along a radial plane of the hub head such that the plurality of spokes define a plurality of tangent lines around an imaginary circle centered at the hub axis, the tangent lines forming a polygon centered at the hub axis, said annular wall of the flange-type hub head being configured as a cylindrical flange having a plurality of notches defined successively around the flange, and the flange-type hub head further including a ring disposed concentrically within the flange, the ring having a plurality of spoke holders, each of the spoke holders protruding radially outwardly through each of the plurality of notches.

9. The hub of claim 8, wherein each of the plurality of spoke holders has a first pair of bores oriented in a direction tangential to the imaginary circle, and a first slit extending between the first pair of bores.

10. The hub of claim 9, wherein each of the plurality of spoke holders further includes a second pair of bores also oriented in a direction tangential to the imaginary circle, and a second slit extending between the second pair of bores, the bores of the first pair and the second pair being arranged in an alternating fashion such that a first bore of the first pair is disposed adjacent a second bore of the second pair on one side of the spoke holder.

11. A hub for aligning a plurality of spokes on a spoked wheel, the hub comprising a cylindrical hub sleeve and a hub axis extending centrally through the hub sleeve;

a flange-tape hub head disposed at one end of the hub sleeve and extending circumferentially about the hub axis, the hub head having an annular wall extending circumferentially around the hub axis and facing radially outwardly, said annular wall being dimensioned and configured to retain and orient each of the plurality of spokes along a radial plane of the hub head such that the plurality of spokes define a plurality of tangent lines around an imaginary circle centered at the hub axis, the tangent lines forming a polygon centered at the hub axis, and another hub head disposed on the hub sleeve.

12. A hub for aligning a plurality of spokes on a spoked wheel, the hub comprising a cylindrical hub sleeve and a hub axis extending centrally through the hub sleeve; and a flange-type hub head disposed at one end of the hub sleeve and extending circumferentially about the hub axis, the hub head having an annular wall extending circumferentially around the hub axis and facing radially outwardly, said annular wall being dimensioned and configured to retain and orient each of the plurality of spokes along a radial plane of the hub head such that the plurality of spokes define a plurality of tangent lines around an imaginary circle centered at the hub axis, the tangent lines forming a polygon centered at the hub axis, and another flange-type hub head disposed at another end of the hub sleeve, said annular wall of said flange-type hub head providing for a radial arrangement of spokes and said another flange-type hub head providing for cross-wise arrangement of spokes.

* * * * *